United States Patent
Kawamura et al.

[19]

[11] Patent Number: 5,557,925
[45] Date of Patent: Sep. 24, 1996

[54] PIPING INSTALLATION FOR LOW TEMPERATURE FLUID

[75] Inventors: Hideki Kawamura; Shinji Tomita; Shuichi Murayama, all of Kako-gun; Yukinobu Nishikawa, Koto-ku, all of Japan

[73] Assignee: Teisan K.K., Japan

[21] Appl. No.: 432,167

[22] PCT Filed: Sep. 9, 1994

[86] PCT No.: PCT/JP94/01494

§ 371 Date: May 8, 1995

§ 102(e) Date: May 8, 1995

[87] PCT Pub. No.: WO95/07434

PCT Pub. Date: Mar. 16, 1995

[30] Foreign Application Priority Data

Sep. 10, 1993 [JP] Japan .................... 5-226238

[51] Int. Cl.$^6$ ........................................ F17C 9/02
[52] U.S. Cl. ............................... 62/50.5; 62/50.7
[58] Field of Search ......................... 62/50.7, 50.1, 62/50.2, 50.5

[56] References Cited

U.S. PATENT DOCUMENTS 4,039,000  8/1977  Fletcher et al. .................. 62/50.7
5,195,325  3/1993  Short et al. ........................ 62/50.7

FOREIGN PATENT DOCUMENTS 58-17300    2/1983   Japan .
60-187386   9/1985   Japan .
61-252984  11/1986   Japan .
63-2233     1/1988   Japan .
9415127     7/1994   WIPO .

Primary Examiner—Ronald C. Capossela
Attorney, Agent, or Firm—Cushman Darby & Cushman, LLP

[57] ABSTRACT

According to the present invention, a piping installation for supplying a low temperature fluid such as liquid nitrogen from a main pipe (17) of transporting the low temperature fluid to predetermined equipments (2, 4, 6), for example a cooling apparatus, by way of branch pipes (18, 19), is characterized in that a thermally insulated pipe having a small outer diameter is used for the branch pipes (18, 19). By reducing the diameter of the branch pipes (18, 19) of the piping installation, the occupation of them in a space can be reduced, whereby spaces (3, 5) where they are installed can be effectively utilized. By reducing the diameter of the branch pipes (18, 19), furthermore, the quantity of the low temperature fluid which has been hitherto discharged wastefully can be decreased.

1 Claim, 2 Drawing Sheets

5,557,925

1
PIPING INSTALLATION FOR LOW TEMPERATURE FLUID

TECHNICAL FIELD

The present invention relates to a piping installation for transportation of a low temperature fluid such as liquid nitrogen or cooled helium gas.

BACKGROUND ART

In a semiconductor manufacturing factory, Flon has been widely used in order to cool down wafers or the likes. However, in the recent years, there is a tendency to use liquid nitrogen as a cold source in place of Flon, because of the danger of causing an environmental destruction by Flon.

In the case where liquid nitrogen is used as a cold source, there is no need of a refrigerating system comprising a compressor, a condenser and etc. In general, it is designed that after liquid nitrogen is introduced from a storage tank into a factory's building through a main pipe, it is supplied to various kinds of semiconductor manufacturing units in clean rooms or other equipments (for example, a cold trap of a high vacuum apparatus and a cooling apparatus for a general heating source) through branch pipes extending from the main pipe.

For the main pipe and branch pipes in such a piping installation for liquid nitrogen, there is used a vacuum insulated pipe to keep cold. From the viewpoints of keeping the cold of liquid nitrogen or preventing its evaporation, in the prior art, such a vacuum insulated pipe includes a thick heat insulating layer or a plurality of heat insulating layers provided in a high vacuum space, and as a result, the heat insulating layer and outer pipe thereof become larger in diameter. Thus, a vacuum insulated pipe whose outer diameter is 60 mm or larger has been used for not only the main pipe but also the branch pipes.

In a piping installation in which vacuum insulated pipes of the large outer diameter are used, however, there is such a problem that a space to be provided with the pipes can not be effectively utilized because the occupation rate of the pipes in the space is high. In particular, it is not desirable to install branch pipes of the large outer diameter in a clean room, because the production cost of the clean room per unit volume is highly expensive.

If the outer diameter of the branch pipes is large, liquid nitrogen will be supplied in an amount larger than the amount of its practical use in a semiconductor manufacturing unit or the like, and as a result, most of liquid nitrogen supplied to the semiconductor manufacturing unit or the like will be discharged as it keeps the utilizable cold. In the prior art, this discharged cold medium is merely released to the atmosphere after its temperature is lowered to normal temperature by a discharge treatment system, and this results in failure in satisfactory thermal utilization of liquid nitrogen.

DISCLOSURE OF INVENTION

It is an object of the present invention to provide a piping installation for a low temperature fluid such as liquid nitrogen, in which the aforementioned problems can be solved.

The piping installation for a low temperature fluid according to the present invention is characterized in that a thermally insulated pipe whose outer diameter is smaller than that of a main pipe is used for branch pipes for supplying a low temperature fluid such as liquid nitrogen to

2 predetermined equipments, for example a semiconductor manufacturing unit.

The inner diameter of the branch pipes is preferably determined so that the low temperature fluid can be supplied in an amount enough to cause the equipments connected thereto to function properly.

In particular, the outer diameter of the branch pipes is effectively 20 to 35 mm.

The low temperature fluid for use in the piping installation according to the present invention is a fluid that is −100° C. or lower under the atmospheric pressure, such as liquid nitrogen or cooled helium gas.

Furthermore, the piping installation according to the present invention is characterized in that means for making use of a used fluid that has been discharged from equipments, for example a semiconductor manufacturing unit, as a cold source are provided.

By making the diameter of branch pipes of a piping installation small, as mentioned above, the occupation of them in a space can be reduced.

When the branch pipes are made too small in diameter, it will be estimated that a low temperature fluid becomes in short supply for equipments connected thereto. However, in case where the inner diameter of the branch pipes is determined so that the low temperature fluid can be supplied to the equipments in a necessary minimum amount as mentioned above, it is possible to make the outer diameter of the branch pipes smaller in an optimum situation.

Further, owing to the provision of means, such as a heat exchanger, for making use of a used fluid that has been discharged from a semiconductor manufacturing unit or the like as a cold source, the low temperature property of the used fluid can be effectively utilized.

BEST MODE FOR CARRYING OUT THE INVENTION

Referring to the accompanying drawings, the preferred embodiment of the present invention will be described in detail.

Figure 1:
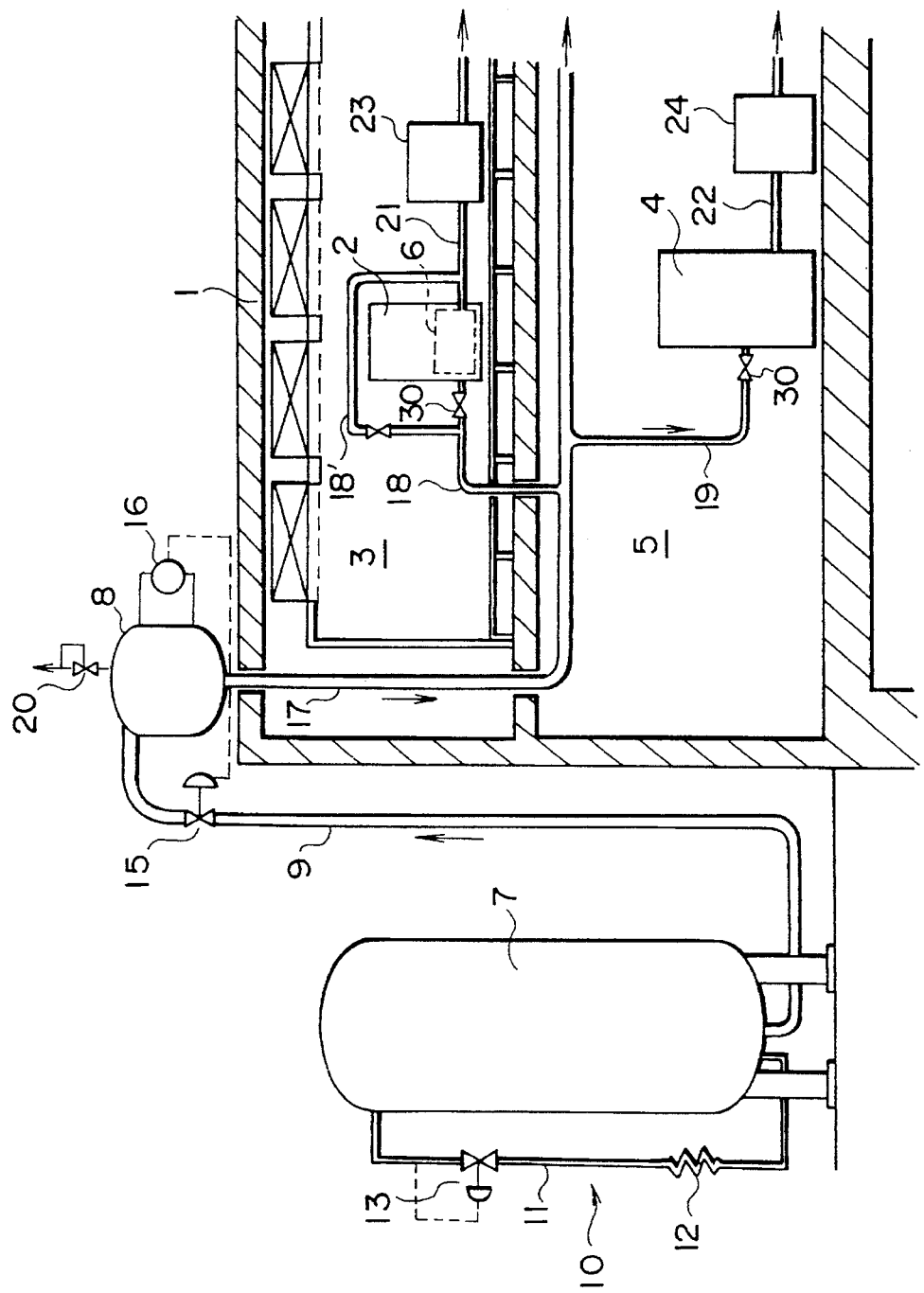
FIG. 1 is an illustrative view showing a semiconductor manufacturing factory having the piping installation for liquid nitrogen according to the present invention.

FIG. 1 shows a portion of a liquid nitrogen supply system in a semiconductor manufacturing factory having the piping installation according to the present invention. In FIG. 1, the reference numeral 1 represents a building of the semiconductor manufacturing factory, and a clean room 3 accommodating a semiconductor manufacturing unit 2 installed therein and a utility room 5 accommodating an auxiliary equipment 4 for manufacture of semiconductors such as a cold trap of a high-vacuum apparatus installed therein are illustrated as the inner rooms of the building. The semiconductor manufacturing unit 2 has a cooling apparatus 6 disposed therein for keeping the temperature of wafers at low temperatures.

A storage tank 7 for storing liquid nitrogen is installed in the outside of the factory's building 1. The tank 7 is made in a vacuum insulated structure. On the roof of the factory's building 1, a gas-liquid separator 8 is installed. This gas-liquid separator 8 and the storage tank 7 are connected with each other through a riser pipe 9 of the vacuum insulated structure arranged along the outer wall of the building 1. Since a part of nitrogen in the storage tank 7 is evaporated so as to exist in the upper inside of the storage tank 7 as pressurized nitrogen gas, the liquid nitrogen in the storage tank 7 is forced to the gas-liquid separator 8 through the riser pipe 9 by virtue of the pressure of this nitrogen gas.

On the storage tank 7, in addition, a pressurizing apparatus 10 is provided in order to keep the pressure of the nitrogen gas constant, because the gas pressure is decreased as the liquid nitrogen in the storage tank 7 is sent to the gas-liquid separator 8. The illustrated pressurizing apparatus 10 is a well-known one, and its structure will be described briefly. Namely, it comprises a pipe 11 communicating the bottom portion and upper portion of the storage tank 7, a pressurized evaporator 12 interposed in this pipe 11, and a solenoid operated valve 13 which detects the internal pressure of the upper portion of the storage tank 7 so as to be actuated for opening and closing operation.

The riser pipe 9 has a solenoid operated valve 15 for controlling supply flow rate, interposed therein. This solenoid operated valve 15 is controlled so as to be opened or closed by a signal from a liquid flow sensor 16 provided on the gas-liquid separator 8, whereby the supply flow rate of liquid nitrogen is regulated to keep the amount of liquid nitrogen in the gas-liquid separator 8 in a predetermined range.

From the bottom portion of the gas-liquid separator 8, a main pipe 17 is extended for introducing liquid nitrogen into the inside of the factory's building 1, and it is fixed at a proper position in the factory's building 1. For this main pipe 17, there is used a large vacuum insulated pipe which is, for example, 30 to 40 mm in inner diameter and 60 to 80 mm in outer diameter, for transporting liquid nitrogen to the whole of the factory's building 1.

The liquid nitrogen introduced to the factory's building 1 through the main pipe 17 is supplied to predetermined equipments such as a cooling apparatus 6 in the semiconductor manufacturing unit 2 and an auxiliary equipment 4 for manufacture of semiconductors, by way of branch pipes 18, 19. For the branch pipes 18, 19, in the illustrated embodiment, there is used a vacuum insulated pipe similarly to the main pipe 17, and it is a small pipe which is as small as 20 to 35 mm in outer diameter. Concretely, a vacuum insulated pipe which is composed of an outer pipe that is 34 mm in outer diameter and about 1 mm in thickness and an inner pipe that is 9.53 mm in outer diameter and about 1 mm in thickness can be effectively used for these branch pipes 18, 19.

For a power source for supplying liquid nitrogen from the gas-liquid separator 8 to the predetermined equipments through the main pipe 17 and branch pipes 18, 19, there is used the pressure of the nitrogen gas evaporated in the gas-liquid separator 8 similarly to the case where liquid nitrogen is supplied from the storage tank 7 to the gas-liquid separator 8. The pressure of the nitrogen gas is kept constant by a pressure control valve 20, and under such a pressure, liquid nitrogen can be supplied in an amount enough to properly operate the cooling apparatus 6 in the semiconductor manufacturing unit 2 or the auxiliary equipment 4 for manufacture of semiconductors, even when small branch pipes 18, 19 that are about 30 mm in outer diameter and about 10 mm in inner diameter are used. It should be noted that these dimensions of the branch pipes 18, 19 can be further reduced, depending on the performance of equipments to be connected thereto. Namely, as far as the liquid nitrogen can be ensured in an amount enough to cause the connected equipments to function properly, the branch pipes 18, 19 may be satisfactorily designed to have such an inner diameter that permits liquid nitrogen of this flow rate to flow therethrough.

By reducing the diameters of the branch pipes 18, 19 as mentioned above, the occupation rate of them in a space can be lowered, thereby enabling to utilize a space in the factory's building 1 effectively. Furthermore, the degree of freedom in the piping layout will be increased because these branch pipes 18, 19 are small in diameter.

In general, an air operated valve or a solenoid operated valve 30 is provided on each of the branch pipes 18, 19 in order to control the supply and stoppage of liquid nitrogen. The branch pipe 18 has a bypass pipe 18' connected therewith between a position upstream of the solenoid operated valve 30 and a position downstream of the semiconductor manufacturing unit 2. This bypass pipe 18' functions as a gas vent pipe for causing nitrogen gas evaporated by virtue of the presence of the solenoid operated valve 30 to bypass the cooling apparatus 6 of the semiconductor manufacturing unit 2 and supplying only liquid nitrogen to the cooling apparatus 6.

The liquid nitrogen supplied to the cooling apparatus 6 in the semiconductor manufacturing unit 2 or the auxiliary equipment 4 for manufacture of semiconductors is used for a predetermined application, for instance, cooling of wafers or heat exchange, and as a result, it rises in temperature and is evaporated. However, the used nitrogen which has been discharged from the semiconductor manufacturing unit 2 or the like has usually a considerable lower temperature still, even if the whole thereof is evaporated. So, it is preferred that this used nitrogen is supplied, for re-use as a cold source, to suitable units such as heat exchangers 23, 24 of a room cooler by way of small-diametered discharge pipes 21, 22. After the cold of the nitrogen supplied to the heat exchangers 23, 24 is thus extracted, the nitrogen is released to the atmosphere.

A solenoid operated valve provided in a piping for a low temperature fluid such as liquid nitrogen has a special structure in order to prevent the temperature of liquid nitrogen from rising. The conventional one of the valves is of large size. In case where the branch pipes 18, 19 is made small in diameter as in the present invention, accordingly, it has been necessary to couple a separate independent air operated valve or solenoid operated valveto the branch pipes 18, 19 by a bayonet joint or the like. However, this is not preferred because the cold keeping property at the joint portion may be damaged. Although there has been hitherto a solenoid operated valve of the type that it is build in a pipe, such a valve may easily get malfunction.

Figure 2A:
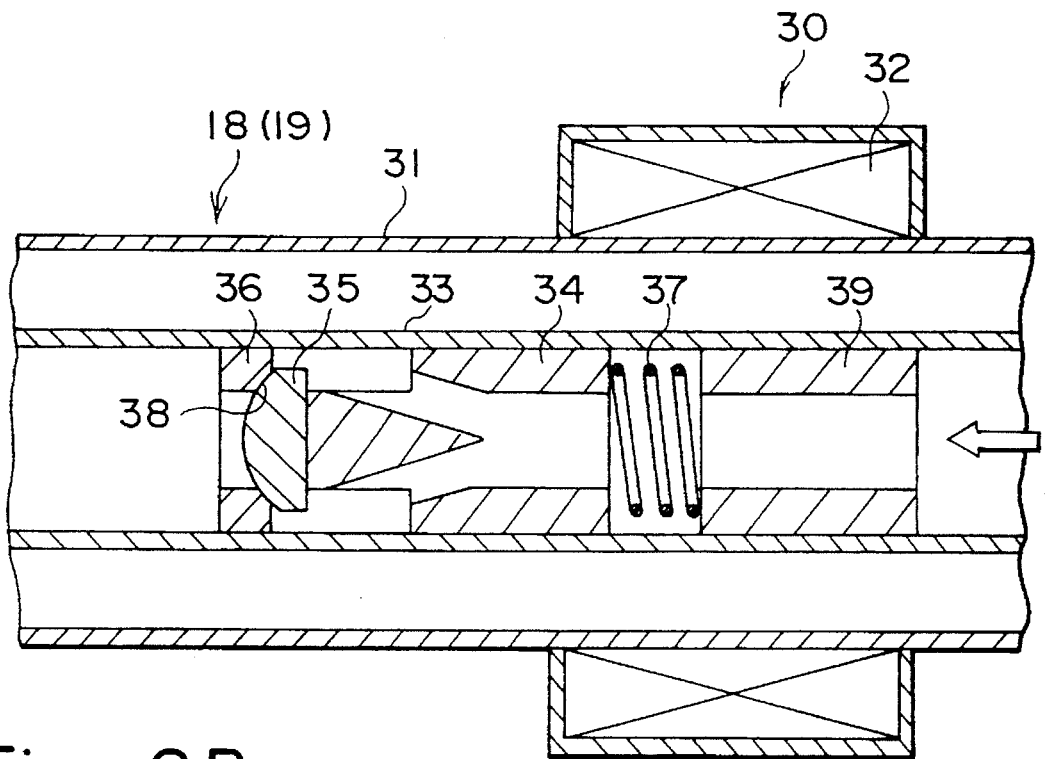
FIG. 2A is a sectional view showing the structure of a solenoid operated valve applicable to the branch pipes of the piping installation according to the present invention, showing the closed condition of the valve.
Figure 2B:
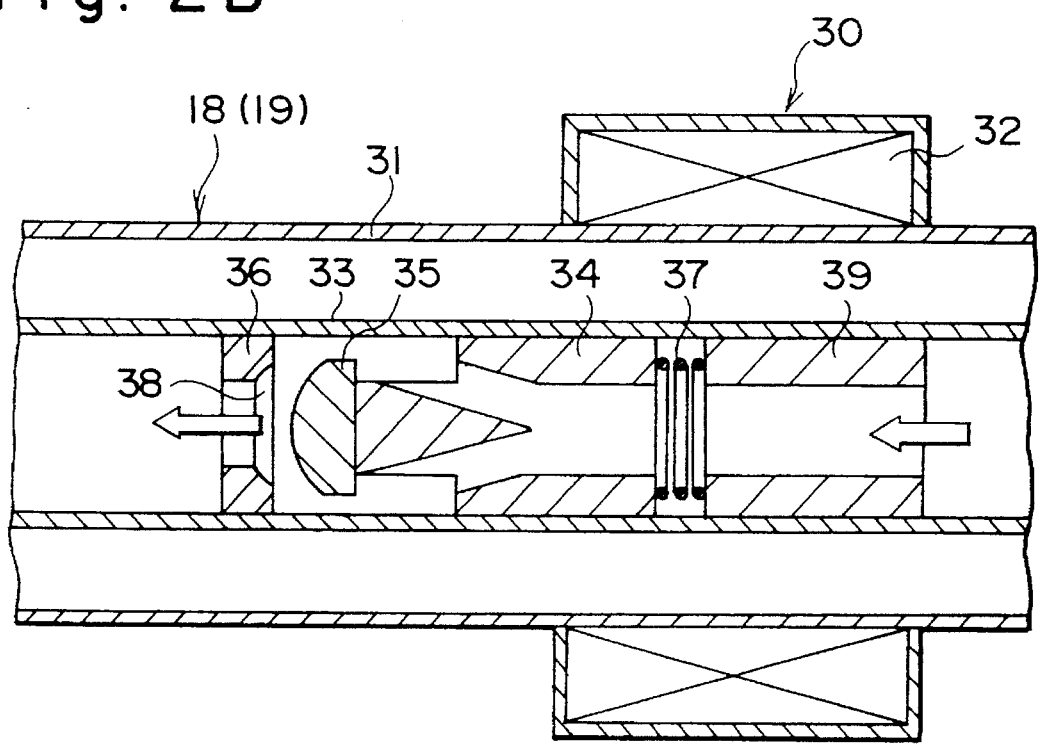
FIG. 2B is a sectional view showing the structure of a solenoid operated valve applicable to the branch pipes of the piping installation according to the present invention, showing the opened condition of the valve.

Although the above-mentioned valves can be used, it is devised, in this embodiment, to use a solenoid operated valve 30 having such a structure as illustrated in FIGS. 2A and 2B. The solenoid operated valve 30 shown in FIGS. 2A and 2B comprises a solenoid coil 32 attached around an outer pipe 31 of each branch pipes 18, 19, a movable core 34 disposed in the inside of an inner pipe 33 of each branch pipes 18, 19 so that it can be reciprocated in the direction of a flow path in the inner pipe 33, a valve body 35 attached to one end of the movable core 34, and an orifice plate 36 which can shut off the flow path in the inner pipe 33 when the orifice plate 36 is brought into contact with the valve body 35. The movable core 34 is biased toward the orifice plate 36 by a spring 37. On the normal operation when the solenoid coil 32 is not supplied with electricity, the valve body 35 is forced down to a valve seat face 38 of the orifice plate 36 so that the flow path is shut off (see the position of FIG. 2A). When the solenoid coil 32 is supplied with electricity so as to be excited, on the other hand, the movable core 34 is moved in a direction reverse to the flowing direction of liquid nitrogen against the spring force of the spring 37, thereby separating the valve body 35 from the orifice plate 36 so that liquid nitrogen can be passed (see the position of FIG. 2B).

For the purpose of decreasing magnetic resistance between the solenoid coil 32 and movable core 34, furthermore, in the solenoid operated valve 30 of this embodiment, a tubular fixed core 39 is provided at a proper place in the inside of the inner pipe 33 of each branch pipes 18, 19 and inside of the solenoid coil 32. Owing to the presence of this fixed core 39, the magnetic resistance of a magnetic circuit between the solenoid coil 32 and movable core 34 is decreased, hereby the valve 30 can be opened or closed reliably even when liquid nitrogen is passing.

A solenoid operated valve with no fixed core 39, which namely comprises only a solenoid coil 32, a movable core 34, a valve body 35 and an orifice plate 36, is of a general construction which has been hitherto known. Such a construction of the prior art has large magnetic resistance between the solenoid coil 32 and movable core 34, because of a double structure of the branch pipes 18,19 composed of the inner pipe 33 and outer pipe 31. Moreover, this valve may get malfunction if a fixed core 39 is not attached, because the fluid pressure of liquid nitrogen is being applied on the movable core 34 and valve body 35 thereof. The solenoid operated valve 30 illustrated in FIGS. 2A and 2B, has no fear of such a malfunction as mentioned above. Furthermore, there is no loss in the cold keeping property in the position where the solenoid operated valve 30 is located, because this valve 30 is of the type that it is built in the branch pipes 18, 19. In the piping installation according to the present invention, in which the branch pipes 18, 19 are made smaller in diameter as much as possible in such an extent as the cold keeping property is not damaged, it can be accordingly understood that this solenoid operated valve 30 has a very effective structure.

Although a vacuum insulated pipe is used for the main pipe 17 and the branch pipes 18, 19 in the aforementioned embodiment, there may be used a thermally insulated pipe of the type that a heat insulating material such as urethane foam is filled between the inner pipe and outer pipe.

Although the aforementioned embodiment relates to a piping installation for liquid nitrogen, it is possible to apply the present invention even to another piping installation, for example, for liquefied argon or cooled helium gas, because it can be understood that this piping installation is utilizable to another fluid, if it is, for example, a fluid that is −100° C. or lower in the manufacture of semiconductors.

The piping installation according to the present invention is applicable to another plant necessitating a low temperature fluid, not limited to the semiconductor manufacturing factory.

By reducing the diameter of the branch pipes extending from the main pipe, as mentioned above, according to the present invention, the occupation of them in a space can be reduced, whereby the space in a position where the branch pipes are installed can be effectively utilized. This is particularly effective in the case where the branch pipes are disposed in a clean room whose production cost per unit volume is expensive.

By determining the inner diameter of the branch pipes in accordance with the performance of the connected equipments, a low temperature fluid can be used in a proper amount, not in over- or under-supply. In particular, in the case where for example heat exchangers, i.e. means from making use of a used fluid, which is a low temperature fluid discharged from equipments, as a cold source are provided, the low temperature fluid can be used more wastelessly and this is preferred from the viewpoint of saving energy.

We claim:

1. An installation for supplying liquid nitrogen to a plurality of equipment units, comprising:

a storage tank for storing the liquid nitrogen;

means for raising an internal pressure of and keeping the internal pressure thereof at said storage tank to a predetermined level;

a first pipe for transporting the liquid nitrogen out of said storage tank;

a gas-liquid separator installed at a position which is higher than positions where said equipment units are installed, for receiving the liquid nitrogen from said first pipe;

means for discharging a part of the nitrogen gas from said gas-liquid separator to keep an internal pressure of said gas-liquid separator at a predetermined level;

a second pipe for transporting the liquid nitrogen out of a bottom of said gas-liquid separator; and a plurality of third pipes diverging from said second pipe, for supplying the liquid nitrogen from said second pipe to said equipment units, respectively, each of said third pipes being a thermally insulated pipe whose outer diameter is smaller than that of said second pipe.

* * * * *